(12) United States Patent
Anderson

(10) Patent No.: US 6,442,649 B1
(45) Date of Patent: Aug. 27, 2002

(54) DYNAMIC EXPANSION OF STORAGE DEVICE ARRAY

(75) Inventor: Michael H. Anderson, Westlake Village, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/377,027

(22) Filed: Aug. 18, 1999

(Under 37 CFR 1.47)

(51) Int. Cl.[7] .............................................. G06F 12/00
(52) U.S. Cl. ........................ 711/114; 711/111; 711/112; 714/6
(58) Field of Search ........................ 711/111, 112, 114, 711/202, 173; 714/6

(56) References Cited

U.S. PATENT DOCUMENTS 5,758,118 A * 5/1998 Choy et al. ................. 711/114
6,000,010 A * 12/1999 Legg ............................ 711/114

* cited by examiner

*Primary Examiner*—Do Hyun Yoo
*Assistant Examiner*—Jasmine Song
(74) *Attorney, Agent, or Firm*—Blakely, Sokoloff, Taylor & Zafman LLP

(57) ABSTRACT

Apparatus and method for adding a storage device to a storage array without requiring a time-consuming reorganization of the data blocks and parity blocks in the original array. At least initially, new data blocks are only placed on the added storage device. The parity blocks that protect these new data blocks at least initially remain at their original locations on the original storage device and are not placed on the new storage device. To avoid having to recalculate the parity blocks after the new storage device is added, the data blocks in the new storage device may be initialized to zeros.

18 Claims, 7 Drawing Sheets

|   | D0 | D1 | D2 | D3 |
|---|---|---|---|---|
| A | 0 | 1 | 2 | $P_{0-2}$ |
| B | 4 | 5 | $P_{3-5}$ | 3 |
| C | 8 | $P_{6-8}$ | 6 | 7 |
| D | $P_{9-11}$ | 9 | 10 | 11 |

FIG. 1
(PRIOR ART)

|   | D0 | D1 | D2 | D3 | D4 |
|---|---|---|---|---|---|
| A | 0 | 1 | 2 | 3 | $P_{0-3}$ |
| B | 5 | 6 | 7 | $P_{4-7}$ | 4 |
| C | 10 | 11 | $P_{8-11}$ | 8 | 9 |
| D | 15 | $P_{12-15}$ | 12 | 13 | 14 |

FIG. 2
(PRIOR ART)

|   | D0 | D1 | D2 | D3 | D4 |
|---|---|---|---|---|---|
| A | 0 | 1 | 2 | $P_{0-2,12}$ | 12 |
| B | 4 | 5 | $P_{3-5,13}$ | 3 | 13 |
| C | 8 | $P_{6-8,14}$ | 6 | 7 | 14 |
| D | $P_{9-11,15}$ | 9 | 10 | 11 | 15 |

FIG. 3

|   | D0 | D1 | D2 | D3 | D4 | D5 |
|---|---|---|---|---|---|---|
| A | 0 | 1 | 2 | $P_{0-2,12,16}$ | 12 | 16 |
| B | 4 | 5 | $P_{3-5,13,17}$ | 3 | 13 | 17 |
| C | 8 | $P_{6-8,14,18}$ | 6 | 7 | 14 | 18 |
| D | $P_{9-11,15,19}$ | 9 | 10 | 11 | 15 | 19 |

FIG. 6

|   | D0 | D1 | D2 | D3 | D4 | D5 |
|---|---|---|---|---|---|---|
| A | 0 | 1 | 2 | $P_{0-2,12-13}$ | 12 | 13 |
| B | 4 | 5 | $P_{3-5,14-15}$ | 3 | 14 | 15 |
| C | 8 | $P_{6-8,16-17}$ | 6 | 7 | 16 | 17 |
| D | $P_{9-11,18-19}$ | 9 | 10 | 11 | 18 | 19 |

FIG. 7

|   | D0 | D1 | D2 | D3 | D4 |
|---|---|---|---|---|---|
| A | 0 | 1 | 2 | 3 | $P_{0-3}$ |
| B | 5 | 6 | 7 | $P_{4-7}$ | 4 |
| C | 8 | $P_{6-8,14}$ | 6 | 7 | 14 |
| D | $P_{9-11,15}$ | 9 | 10 | 11 | 15 |

FIG. 8

DYNAMIC EXPANSION OF STORAGE DEVICE ARRAY

BACKGROUND OF THE INVENTION

1. Field of the Invention

This invention relates to storage device arrays and, more particularly, to techniques for increasing the size of storage device arrays, while minimizing the disruption caused by the initialization of the enlarged array.

2. Description of Related Art

The use of an array of storage devices to store computer data is well known. One such device is known as RAID, an acronym for a redundant array of inexpensive drives.

RAIDs consist of a plurality of disk drives configured to operate simultaneously in harmony. In a typical configuration, a segment of data is broken into a plurality of blocks, each one of which is simultaneously written to or read from each of the drives in a RAID configuration. This effectively multiplies the speed at which the segment of data can be read or written by the number of drives in the configuration.

To protect against an error during the reading operation, a parity block is created for each set of data blocks when each is written. Typically, the parity block is stored on one of the drives in the array, while the data blocks that it protects are each stored on a different drive in the array. When it is desired to read a data block from the storage device, the parity block can be used to re-create that data block if it is unavailable, based on the information contained in the parity block and in the other data blocks that the parity block protects. Typically, an exclusive-or function is utilized to calculate the parity block in accordance with well-known techniques.

In more advanced RAID systems, such as systems that implement what is known as RAID Level 5, parity blocks are not all stored on a single drive. Instead, they are distributed across all of the drives in the RAID. As is well known, this enhances overall performance.

The computer to which the storage device array is attached is often unaware of the physical layout of the array or, more fundamentally, that there is an array of devices. It typically refers to each block of data by what is known as a "logical block address" or an "LBA." Each data block has a different logical block address.

A RAID typically includes an address translator that translates the logical block address of each data block into each actual address in the RAID system. Each actual address, in turn, typically consists of the identity of the storage device in the array on which the block is stored, plus the exact location (logical or physical) of the block on that storage device. In order to allow the data block to be recreated if it is not available, the RAID also keeps track of the parity block that is associated with the data block, as well as the other data blocks that are protected by that parity block.

Various techniques are used to generate this address translation information. Although a map can be used, it is typically faster and more efficient to use an algorithm. Such an algorithm is typically applied to each logical block address to generate the actual address of the block in the storage array device, as well as the actual address of its corresponding parity block and the other data blocks which are protected by that parity block. Each time a data block is modified, the storage device array updates the data block which is actually stored in the array, as well as its corresponding parity block.

Another advantage of a RAID is that it readily facilitates an incremental increase in the size of the storage array, without having to require a corresponding change in the logical block addressing system of the computer to which the storage array is attached. A new storage device is simply added to the array and the algorithm which is used to derive actual data and parity block addresses from the logical block address is revised to embrace the new storage device.

Unfortunately, the updated algorithm usually generates an actual data address and actual parity address for each logical block address that is different than the ones generated by the original algorithm. As a consequence, some mechanism must be provided to rearrange all of the existing data blocks and parity blocks to the locations that conform, respectively, to the updated algorithm.

Backing up is one technique which is employed to achieve this result. Before the new storage device is added, all of the data on the storage device array is copied to a back-up device, such as a tape drive. The new storage device is added, the address translation algorithm is modified to account for the new device, and all of the data stored in the back-up device is restored to the enlarged system.

Unfortunately, this process can often take several hours and even days. In the meantime, the storage device is usually not available to the computer, causing significant interference with the normal operations of the computer. In many applications, this is highly undesirable.

SUMMARY OF THE INVENTION

The invention expands the size of a storage array on a dynamic basis, without requiring a back-up or the application of any other type of time-consuming block-reorganization technology.

In one embodiment of the invention, a storage device array for storing and retrieving a first and second set of data blocks is provided. Each data block has an intended data address. The array includes a first storage area containing two or more storage devices and a second storage area containing one or more storage devices. The array further includes an address translator for translating each intended data address into an actual data address where its data block is or will be stored in the array and into an actual parity address where each associated parity block is or will be stored in the array. Each intended address of a data block from the first set is translated into an actual data address be on one of the storage devices in the first storage area and an actual parity address on another of the storage devices in the first storage area. Each intended address of a data block from the second set is translated into an actual data address on one of the storage devices in the second storage area and an actual parity address on one of the storage devices in the first storage area.

In another embodiment of the invention, a method of storing and retrieving a first and second set of data blocks in a storage device array is provided. Each data block has an intended data address. The array contains a first storage area containing two or more storage devices and a second storage area containing one or more storage devices. The array also includes an address translator for translating each intended data address into an actual data address where its data block is or will be stored in the array and an actual parity address where its associated a parity block is or will be stored in the array. If the intended address of a data block is from the first set, the method makes the actual data address always on one of the storage devices in the first storage area and the actual parity address always on another of the storage devices in the first storage area. If the intended address is of a data block from the second set, the method makes the actual data address always on one of the storage devices in the second storage area and the actual parity address always on one of the storage devices in the first storage area.

These, as well as still further features, advantages and benefits of the present invention will now become clear upon an examination of the attached drawings and the following description of the preferred embodiments.

BRIEF DESCRIPTION OF THE DRAWINGS

FIG. 1 illustrates the layout of data and parity blocks in a typical prior art storage device array.

FIG. 2 illustrates the changes to the layout of the data and parity blocks in FIG. 1 that are typically caused in the prior art by the addition of a storage device to the array.

FIG. 3 illustrates the changes to the layout of the data and parity blocks in FIG. 1 that are caused when a storage device is added in accordance with one embodiment of the present invention.

FIG. 6 illustrates the changes to the layout of the data and parity blocks in FIG. 1 that are caused when two storage devices are added in accordance with one embodiment of the present invention.

FIG. 7 illustrates the changes to the layout of the data and parity blocks in FIG. 1 that are caused when two storage devices are added in accordance with another embodiment of the present invention.

FIG. 8 illustrates the changes to the layout of the data and parity blocks in FIG. 1 that are caused when a storage device is added in accordance with another embodiment of the present invention half way through the relocation process of this embodiment.

DESCRIPTION OF THE PREFERRED EMBODIMENTS

Figure 4:
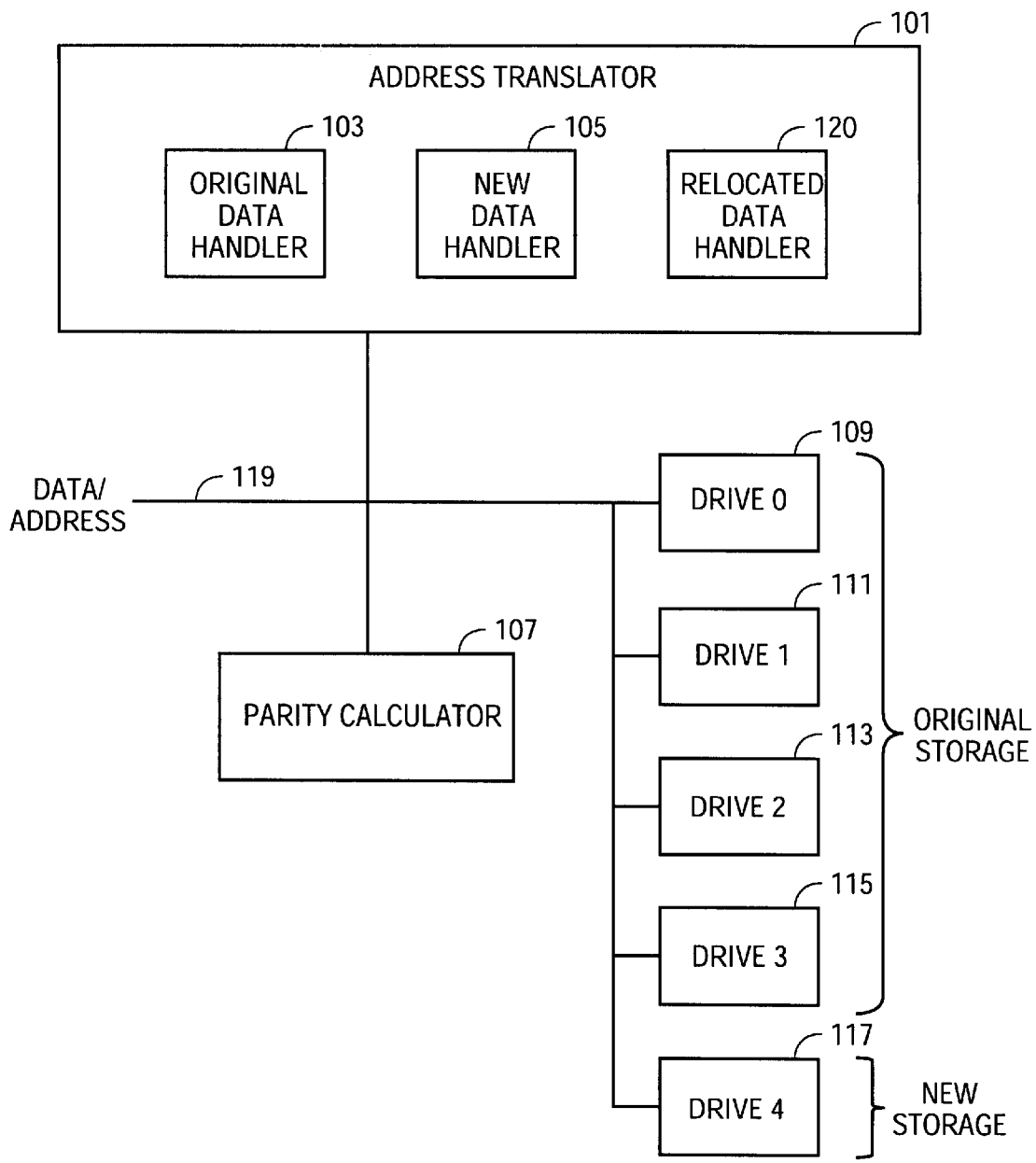
FIG. 4 is a block diagram of one embodiment of the present invention.

FIG. 1 illustrates the layout of data and parity blocks in a typical prior art storage device array.

As shown in FIG. 1, this array consists of drives D0, D1, D2 and D3. Data blocks having logical block addresses of 0 through 11 are shown in FIG. 1 as being stored in one of the drives D0 through D3 and at one of the addresses A, B, C or D on each drive.

FIG. 1 also illustrates a set of parity blocks, $P_{0-2}$, $P_{3-5}$, $P_{6-8}$ and $P_{9-11}$, each on a different one of drives D0, D1, D2 and D3 and at a different address in each drive.

As is well known, parity block $P_{0-2}$ is said to "protect" data blocks 0, 1 and 2. If any one of these data blocks becomes unavailable because, for example, of a hardware or software failure, it can be re-created using parity block $P_{0-2}$, together with the remaining data blocks that this parity block protects.

As is also well known, there are many ways to calculate the information in the parity blocks. One very common approach is to make each bit of the parity block equal to the "exclusive-or" of each corresponding bit of the data blocks which it protects.

In a similar fashion, parity block $P_{3-5}$ protects data blocks 3, 4 and 5; parity block $P_{6-8}$ protects data blocks 6, 7 and 8; and parity block $P_{9-11}$ protects data blocks 9, 10 and 11.

As is readily apparent from an examination of FIG. 1, the parity blocks are not all stored on the same drive. In RAID configurations that predated RAID level 5, all of the parity blocks were typically stored on the same drive. It was found, however, that performance increases could be achieved by distributing the parity blocks over all of the drives. The reason lies in the fact that, in a typical application, a request for a specific data block usually results in the simultaneous request for both that data block and the parity block that protects that data block. If the parity blocks are distributed across the drives in the array, there is a statistical probability that a subsequent data request can be fully satisfied without using any of the drives in the prior data request and, as a consequence, can begin to be fulfilled before the prior data request is fulfilled. If all of the parity blocks are on the same drive, however, there is no such statistical probability.

In a typical configuration, the computer is unaware of the physical structure of the storage device or, for that matter, that it contains an array of storage devices. The computer often perceives the storage device array as containing only a large single drive when, in fact, it contains a plurality of smaller drives.

Of course, it is possible to alter the computer's perception to make it more consistent with the physical structure of the storage device that is being used. However, such an approach oftentimes will add undesirable overhead or complexities.

A more common approach is to provide an address translator that translates the address specified by the computer for each data block—typically referred to as a logical block address ("LBA")—into the actual address of the data block in the storage array. Typically, the actual address consists of two components: an identification of the drive in the array at which the block is or will be located, and an identification of the address on that particular drive at which the block is or will be located. The actual address of the block on the particular drive can be a physical address or a logical address.

In order to implement the distribution of parity blocks across the array in a RAID Level 5 configuration, some method and apparatus must be employed to effectuate the needed distribution during write operations and to determine where each block is located during read operations.

One technique of achieving this is to utilize a set of algorithms that translate each logical block address into the actual address (i.e., the drive and drive location) of its data block, as well as into the actual address (i.e., drive and drive address) of the parity block that protects the data block, as well as the other data blocks that are protected by this parity block.

As is well known, the number of data blocks that must be stored in a storage array sometimes grow and exceed the size of the array. As a result, the size of the storage array must be increased.

One of the advantages of a RAID is that it allows incremental increases in the size of the array at relatively-low cost. If only a single storage device is used, an incremental increase would often require the replacement of that device with a larger device, the cost of which would substantial. In a RAID, however, a small and inexpensive drive can often be added to solve the problem, while all of the original storage devices are used. In fact, RAID systems are often specifically designed to facilitate the addition of more storage devices to the system.

Unfortunately, adding an additional storage device usually causes a corresponding change in the actual address of each data block and the parity block that protects it. This is because the algorithms that are used to calculate these actual addresses—such as the algorithms set forth above—yield a different actual address for many of the same logical block addresses when the number of drives, N, is increased.

This is illustrated in FIG. 2. FIG. 2 illustrates the changes to the layout of the data and parity blocks shown in FIG. 1 that are typically caused in the prior art by the addition of a storage device D4 to a RAID array.

As shown in FIG. 2, the actual address of data blocks 3–13 has changed. All of the actual addresses of the parity blocks that protect all data blocks have also changed.

There must, of course, be a method for effectuating these address changes after a new storage device is added to the array. One typical way is to back-up all of the data blocks before the new drive is added; to add the new drive; and to then fully restore the back-up to the enlarged array.

Although effective, this process is also time consuming, often requiring several hours or even days. During the process, the storage array is usually unavailable to the computer, oftentimes causing highly-undesirable interference with the operation of the computer. Additional personnel are also often required to change back-up tapes during the process, since one tape is often insufficient to store all of the data on the original array.

The present invention is both an apparatus and method for increasing the size of a storage array, without causing these problems.

FIG. 3 illustrates the changes to the layout of the data and parity blocks in FIG. 1 that are caused when a storage device is added in accordance with one embodiment of the present invention.

As shown in FIG. 3, the actual addresses of original data blocks 0 through 11 and the parity blocks that protect them do not change after a new storage device, such as drive D4, is added to the array. They continue to remain at the same location as shown in FIG. 1. At the same time, all of the new data blocks, i.e., new data blocks 12–15, are stored in the new storage device D4.

One principal difference between the layout that results in the prior art from adding a storage device (FIG. 2) and the layout that results from the method and apparatus of the present invention (FIG. 3) is that, with the invention, all of the parity blocks for the entire enlarged array remain distributed across all of the original storage devices. None are placed on the new storage device.

Of course, each parity block now protects an additional data block, i.e., a data block on the new storage device. Parity block $P_{0-1}$ in FIG. 1 is shown in the same position in FIG. 3, except that it is designated as parity block $P_{0-1,12}$ to indicate that it also now protects new data block 12. The designation of each remaining parity block has also been changed to similarly indicate that it protects the new data block in drive D0 at the same address.

In order for each parity block to protect its associated data block on the new storage device, of course, the information contained within the parity block must accurately reflect the results of the application of the parity-calculating algorithm to the information in the new data block, as well as the information in the original data blocks that the parity block originally protected.

One way of accomplishing this, of course, is to simply recalculate each parity block after the addition of the new storage device. In many applications, however, such a calculation is undesirable. Not only does it place a signifi-cant load upon the system, but it creates the prospect of ambiguity if the recalculation process is interrupted before its completion.

Another embodiment of the present invention includes an apparatus and method which eliminates this problem. In this embodiment, each new data block in the new storage device is initialized to the value that would be calculated for this data block based on application of the parity-calculating algorithm to its corresponding parity block and to the original data blocks protected by that parity block. When the parity-calculating algorithm is the "exclusive-or" function, application of this rule usually dictates that all of the new data blocks be initialized to zeros. Once so initialized, the existing parity block that corresponds with each new data block is already correct to enable re-creation of the new data block and hence does not need to be recalculated.

FIG. 4 is a block diagram of one embodiment of the present invention. As shown in FIG. 4, it includes an address translator 101 connected to a data/address bus 119. The address translator includes an original data handler 103, a new data handler 105 and, optionally, a relocated data handler 120. This embodiment also includes a parity calculator 107; a plurality of original storage devices, such as storage devices 109, 111, 113 and 115; and an optional new storage device 117.

Figure 5:
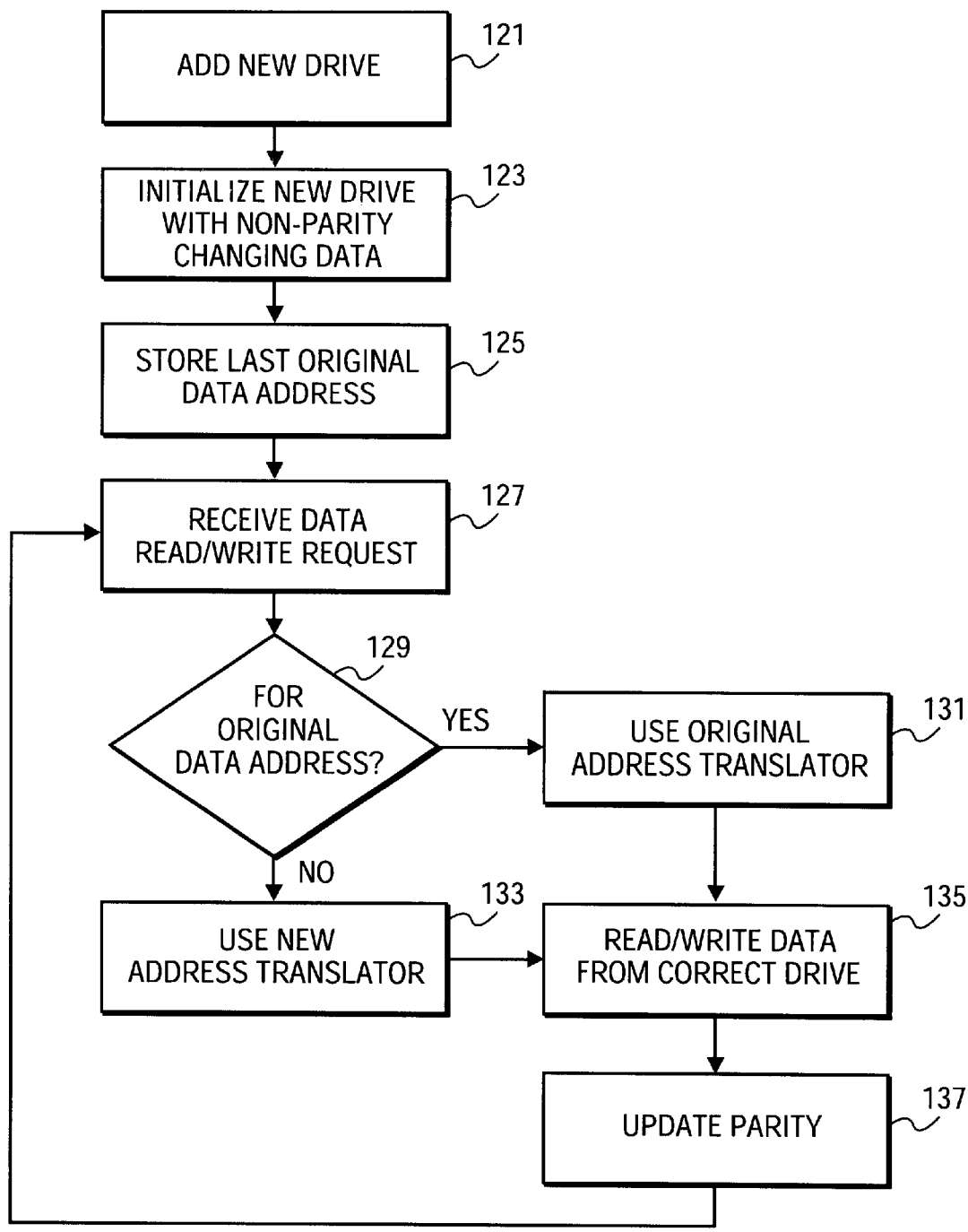
FIG. 5 is a block diagram of the method implemented by the embodiment of the invention shown in FIG. 4.

FIG. 5 is a block diagram of the method implemented by the embodiment of the invention shown in FIG. 4. Operation of this embodiment will now be explained.

Before the new storage device 117 is added, the system shown in FIG. 4 operates much like the prior art. Logical block addresses for each data block are received by the address translator 101 and translated into the actual address of the data block, i.e., to the identity of the drive storing the block, such as drives 109, 111, 113 or 115, and to the address of that block (logical or physical) on that drive. The original data handler 103 of the address translator 101 calculates this information through the application of algorithms, such as those set forth above, or through a reference to a data address map, all in accordance with well know and established techniques.

During write operations, the parity calculator 107 calculates the information that should be stored in the parity block that protects each data block, based on the information contained in each data block and the other data blocks protected by that parity block. During unsuccessful read operations, the parity calculator 107 calculates the data that was stored in the unsuccessfully read data block, based on the information stored in the parity block that protects it, as well as the other data blocks that are protected by that parity block. This is all done in accordance with established and known techniques, such as by application of well-know exclusive-or parity calculation logic.

Before Drive 4 is added, the new data handler 105 and, if it is include, the optional relocated data handler 120 lie dormant.

The first step in the process of the invention, of course, is to add the new drive 117 to the array, as shown in FIG. 4 and as described in block 121 of FIG. 5. This is done in accordance with well-known techniques.

The next step is to initialize the data blocks on the new drive 117 with values that will not require changes in the content of the original parity blocks that now protect them, as described in block 123 of FIG. 5. When those parity blocks are calculated using the exclusive-or function, the initialization values are usually zeros.

Although having described this step as being performed after the addition of the new drive 117, it is to be understood that the invention alternatively contemplates that this initialization can occur before the new drive is added to the array. In most applications, it will not matter whether it is done before or afterwards. Although not as beneficial, the invention also contemplates that there be no initialization, in which event all of the parity blocks will have to be recalculated promptly after the new drive is added.

The next step is to make a record of the information that will be needed to distinguish between the first set of data blocks that were stored on the array before it was enlarged and the second set of data blocks that will be stored on the new storage device that is added to the array, as reflected in block 125 in FIG. 5. This record-making operation can be implemented in numerous ways. One such way is to record the number of the last data block that the original array was able to store. This information may be stored in the manual settings of a bank of rocker switches, on a storage device, or in firmware.

Although this operation has just been described as being done after the addition of the new storage device 117, it is to be understood that the invention also contemplates that this operation could be performed beforehand, either just before the new drive is added or when the original array is constructed.

The next step of the process is to receive a request over the data/address line 119 to read or write a particular data block, as reflect by block 127 in FIG. 5. Typically, this is over a single bus that communicates on a time-splicing basis both the logical block address of the data block and the content of the data block. However, a separate bus or channel could be provided for both functions, as is also well known in the art.

After receiving the logical block address, the address translator 101 makes an initial determination whether that logical block address is one that was handled by the array before it was enlarged, as shown in decision block 129 in FIG. 5. If it is, the address translator 101 calculates the actual address of that data block and, as needed, its associated parity block and the other data blocks protected by that parity block, using the original address-calculating algorithms that were originally used to calculate these addresses before the new storage device 117 was added. This computation is performed by original data hander 103 in address translator 101, as reflected by block 131 in FIG. 5.

On the other hand, if the logical block address of the data block is outside of the range of original block addresses, the actual address of that data block and, as needed its associated parity block and the other data blocks protected by that parity block, are calculated using a new set of address-calculating algorithms by the new data handler 105.

The invention contemplates that a broad variety of new address-calculating algorithms could be used or even a map. The important criteria is that the algorithms (or map) always place the actual address of data blocks from the second set on the new storage device, and the actual address of the parity blocks that protects them and the other data blocks that they protect on the original storage devices.

Whichever pathway is followed, the data block is then read or written from the actual calculated address, as shown in block 135 of FIG. 5. It this was a write operation, the parity block that protects it is then updated, as shown in block 137, and the system is readied to receive the next read or write instruction.

Thus far, the invention has been described as involving the addition of only one new storage device. In fact, however, the invention is equally applicable to the addition of any number of new storage devices. If the number is greater than one, the rule of the invention is still applied: all new data blocks are stored only on the new drives, while all of the parity blocks that protect them continue to be stored on the original drives, preferably in their original locations.

FIG. 6 illustrates the changes to the layout of the data and parity blocks in FIG. 1 that are caused when two storage devices are added in accordance with another embodiment of the present invention. In FIG. 6, the new data blocks 12 through 19 are stored on the new storage devices, while the parity blocks that protect them remain in their original locations on the original drives in the storage array. As indicated by the designations for each parity block, each parity block now protects two additional data blocks, rather than the single additional data block shown in FIG. 3.

FIG. 7 illustrates the changes to the layout of the data and parity blocks in FIG. 1 that are caused when two storage devices are added in accordance with another embodiment of the present invention. This embodiment is similar to FIG. 6, except that the algorithm for the new data blocks causes neighboring blocks to be distributed across the new drives, rather than on a single drive, such as shown in FIG. 6. Placing neighboring new blocks across the new drives often enhances average performance. This is because sequential requests for data blocks are typically for neighboring data blocks. As is well known, placing neighboring blocks on the same drive often slows performance.

As described above, the performance of a storage array is usually enhanced by distributing the parity blocks across all of the drives in the array. With the embodiments of the invention that have thus-far been described, however, none of the parity blocks are initially placed on any of the new storage devices. Although this initially results in a very quick, efficient and unobtrusive upgrade process, it also results in a performance level somewhat below what the performance would be if the parity blocks were also placed on the new drives, such as is usually done in prior art systems, as shown in FIG. 2.

A still further embodiment of the invention provides the benefit of both worlds. Initially, no parity blocks are placed on the new storage device(s). As time permits, however, parity blocks are distributed across the new storage devices and the old and new data blocks are also relocated so that the old and new data blocks and their associated parity blocks are distributed across all of the drives, including the new drive(s), as illustrated in FIG. 2.

This additional feature, however, requires some caution and additional complexities. First, the optional relocated data handler 120 uses a third set of algorithms that produce the data and parity block distribution shown in FIG. 4. The original data handler 103 continues to handle translations of those logical block addresses that were originally handled by the storage array before the addition of the new drives that have not yet been subject to the relocation process; the new data handler 105 continues to handle translations of those logical block addresses that were not originally handled by the original array before the addition of the new storage devices and that have not yet been subject to the relocation process; and the relocated data handler 120 handles the translation of those logical block addresses that have been relocated. Once the relocation is complete, the relocated data handler 120 handles the translations for all of the logical block addresses, and the original data handler 103 and new data handler 105 need not be used, at least until such time as a further addition to the storage array is made.

FIG. 8 illustrates the changes to the layout of the data and parity blocks in FIG. 1 that are caused when a storage device is added in accordance with this other embodiment of the present invention half way through the relocation process of this embodiment. As can be seen if FIG. 8, data blocks 0–7 have been relocated and are being managed by the relocated address handler 120; data blocks 6–11 have not yet been relocated and are being managed by the original data address handler 103; and data blocks 14–15 have not yet been relocated and are being managed by the new data address handler 105.

Although the data handlers have thus-far been described as separate components, it is to be understood that the invention also contemplates that a single component could implement the differing algorithms depending upon the value of the logical block address. Alternatively, a single map with appropriate entries could be used.

The invention contemplates that the various components of the invention be implemented by hardware, software, firmware or by a combination of them. This is done in accordance with well known and established techniques.

It should also be understood that the invention contemplates that the storage array of the invention include all types of storage devices other than hard disk drives, such as CD-ROMs.

Although only a few actual addresses have been illustrated in FIGS. 3, 6, 7 and 8, it is also to be understood that, in practice, there are thousands and even millions of addresses at which blocks are stored. The simplified tables that have been shown in these figures are for illustration purposes only.

These figures have also illustrated the parity block as protecting data blocks at the same address in each drive. The invention is also applicable to configuration in which the parity block protects data blocks at different addresses.

In short, the invention may take the form of a broad variety of embodiments. Those that have been thus-far discussed are merely illustrative. The invention is limited solely by the scope of the following claims.

What is claimed is:

1. A storage device array for storing and retrieving a first and second set of data blocks, each data block having an intended data address, comprising:
   a) a first storage area containing two or more storage devices;
   b) a second storage area containing of one or more storage devices, said second storage area having been added to the array after said first storage area had been storing and retrieving data blocks from the first set; and
   c) an address translator for translating each intended data address into an actual data address where its data block is or will be stored in the array and an actual parity address where a parity block that protects the data block is or will be stored in the array, wherein at least initially after the second storage area is added to the array:
      i) each intended address of a data block from the first set is translated into an actual data address on one of the storage devices in said first storage area and an actual parity address on another of the storage devices in said first storage area; and
      ii) each intended address of a data block from the second set is translated into an actual data address on one of the storage devices in said second storage area and an actual parity address on one of the storage devices in said first storage area.

2. The array of claim 1 in which each of said storage devices are hard disk drives.

3. The array of claim 1 in which data blocks in said second storage area are initialized to a value that causes the parity blocks that protect them to protect them without modification of the values that the parity blocks had immediately prior to the addition of the second storage area.

4. The storage array of claim 3 wherein the data blocks in the second storage area are initialized to zeros.

5. The storage array of claim 1 wherein the array relocates some of the data blocks and their associated parity blocks after the second storage area is added, wherein the array stores and retrieves the first and second set of data blocks during the relocation process, and wherein:
   i) each intended address of a data block from the first set that has not been relocated is translated into an actual data address on one of the storage devices in said first storage area and an actual parity address on another of the storage devices in said first storage area;
   ii) each intended address of a data block from the second set that has not been relocated is translated into an actual data address on one of the storage devices in said second storage area and an actual parity address on one of the storage devices in said first storage area; and
   iii) at least one intended address of a data block that has been relocated is translated into an actual parity address on a storage device in said second storage area.

6. The storage array of claim 5 wherein at least one intended address of a data block from the second set that has been relocated is translated into an actual data address on a storage device in said first storage area.

7. The storage array of claim 1 in which algorithms are utilized to compute the actual data addresses and actual parity addresses.

8. The storage array of claim 1 wherein said second storage area includes two or more storage devices.

9. The storage array of claim 8 in which sets of data blocks from the second set having intended addresses that are sequential are stored on more than one of said storage devices in said second storage area.

10. A method of storing and retrieving a first and second set of data blocks in a storage device array, each data block having an intended data address and the array containing a first storage area containing two or more storage devices, a second storage area containing one or more storage devices, the second storage area having been added to the array after the first storage area had been storing and retrieving data blocks from the first set, and an address translator for translating each intended data address into an actual data address where its data block is or will be stored in the array and an actual parity address where a parity block that protects the data block is or will be stored in the array, comprising:
   if the intended address is of a data block from the first set, making each actual data address on one of the storage devices in the first storage area and each actual parity address on another of the storage devices in the first storage area; or
   if the intended address is of a data block from the second set, making the actual data address on one of the storage devices in the second storage area and the actual parity address on one of the storage devices in the first storage area.

11. The method of claim 10 in which the storage devices are hard disk drives.

12. The method of claim 10 in which data blocks in the second storage area are initialized to a value that causes the parity blocks that protect them to protect them without modification of the values that the parity blocks had immediately prior to the addition of the second storage area.

13. The method of claim 12 wherein the data blocks in the second storage area are initialized to zeros.

14. The method of claim 10 wherein some of the data blocks and their associated parity blocks are relocated after the second storage area is added, wherein the array stores and retrieves the first and second set of data blocks during the relocation process, and wherein:

i) each intended address of a data block from the first set that has not been relocated is translated into an actual data address on one of the storage devices in the first storage area and an actual parity address on another of the storage devices in the first storage area;

ii) each intended address of a data block from the second set that has not been relocated is translated into an actual data address on one of the storage devices in the second storage area and an actual parity address on one of the storage devices in the first storage area; and iii) at least one intended address of a data block that has been relocated is translated into an actual parity address on a storage device in the second storage area.

15. The method of claim 14 wherein at least one intended address of a data block from the second set that has been relocated is translated into an actual data address on a storage device in the first storage area.

16. The method claim 10 in which algorithms are utilized to compute the actual data addresses and actual parity addresses.

17. The method of claim 10 wherein the second storage area includes two or more storage devices.

18. The method of claim 17 in which sets of data blocks from the second set having intended data addresses that are sequential are stored on more than one of the storage devices in the second storage area.

* * * * *